(12) United States Patent
McRae et al.

(10) Patent No.: US 9,110,509 B2
(45) Date of Patent: Aug. 18, 2015

(54) SYSTEM, METHOD AND APPARATUS FOR CONTROLLING PRESENTATION OF CONTENT

(75) Inventors: Matthew Blake McRae, Laguna Beach, CA (US); Victor Brilon, Mountain View, CA (US)

(73) Assignee: Vizio Inc., Irvine, CA (US)

( * ) Notice: Subject to any disclaimer, the term of this patent is extended or adjusted under 35 U.S.C. 154(b) by 210 days.

(21) Appl. No.: 12/844,921

(22) Filed: Jul. 28, 2010

(65) Prior Publication Data

US 2012/0030632 A1 Feb. 2, 2012

(51) Int. Cl.
G06F 3/033 (2013.01)
G06F 3/01 (2006.01)
G06F 3/0488 (2013.01)
H04N 21/41 (2011.01)
H04N 21/436 (2011.01)
H04N 21/472 (2011.01)

(52) U.S. Cl.
CPC ............ *G06F 3/017* (2013.01); *G06F 3/04883* (2013.01); *H04N 21/4126* (2013.01); *H04N 21/43615* (2013.01); *H04N 21/47214* (2013.01)

(58) Field of Classification Search
USPC ......................................................... 715/863
See application file for complete search history.

(56) References Cited

U.S. PATENT DOCUMENTS

| 6,041,045 | A * | 3/2000 | Alterman et al. ............. 370/313 |
|---|---|---|---|
| 6,549,818 | B1 * | 4/2003 | Ali ................................... 700/90 |
| 7,623,892 | B2 * | 11/2009 | Hawkins ..................... 455/556.1 |
| 8,046,701 | B2 * | 10/2011 | Chiu et al. ..................... 715/761 |
| 8,200,265 | B2 * | 6/2012 | Carlton et al. ................ 455/509 |
| 8,676,175 | B2 * | 3/2014 | Cheng et al. ................ 455/414.1 |
| 8,775,850 | B2 * | 7/2014 | Moy .............................. 713/400 |
| 8,799,496 | B2 * | 8/2014 | Phillips et al. ................ 709/231 |
| 2007/0012307 | A1 * | 1/2007 | Wiker et al. ................. 126/21 A |
| 2007/0016476 | A1 * | 1/2007 | Hoffberg et al. ................ 705/14 |
| 2007/0146347 | A1 * | 6/2007 | Rosenberg .................... 345/173 |
| 2009/0054108 | A1 * | 2/2009 | Kito ............................. 455/566 |
| 2009/0115723 | A1 * | 5/2009 | Henty .......................... 345/158 |
| 2009/0140986 | A1 * | 6/2009 | Karkkainen et al. .......... 345/173 |
| 2009/0259688 | A1 * | 10/2009 | Do et al. ..................... 707/104.1 |
| 2009/0307780 | A1 * | 12/2009 | Dubhashi et al. ............... 726/27 |
| 2009/0319672 | A1 * | 12/2009 | Reisman ....................... 709/227 |
| 2010/0138743 | A1 * | 6/2010 | Chou ............................ 715/702 |
| 2010/0281395 | A1 * | 11/2010 | Apted .......................... 715/748 |
| 2011/0065459 | A1 * | 3/2011 | Cheng et al. ................... 455/457 |
| 2011/0090953 | A1 * | 4/2011 | Melnyk et al. ............ 375/240.03 |
| 2011/0131520 | A1 * | 6/2011 | Al-Shaykh et al. ........... 715/772 |
| 2011/0196826 | A1 * | 8/2011 | Retief et al. .................. 707/621 |

(Continued)

OTHER PUBLICATIONS

W3C, Extensible Markup Language, Nov. 26, 2008, http://www.w3.org/TR/REC-xml/.*

(Continued)

*Primary Examiner* — Matt Kim
*Assistant Examiner* — Maryam Ipakchi
(74) *Attorney, Agent, or Firm* — Law Office of Scott C. Harris, Inc.

(57) ABSTRACT

An application for a system that enables cooperating devices to transfer presentation of content from one device to the other by sending either the content or an identification of content from a source device to a destination device. In some embodiments, the actual content is transferred while in other embodiments, an identification of the content and a position within the content is transferred from the source device to the destination device.

4 Claims, 6 Drawing Sheets

(56) References Cited

U.S. PATENT DOCUMENTS

| | | | |
|---|---|---|---|
| 2011/0197147 A1* | 8/2011 | Fai .................................. | 715/753 |
| 2011/0219340 A1* | 9/2011 | Pathangay et al. ............ | 715/863 |
| 2011/0239114 A1* | 9/2011 | Falkenburg et al. ........... | 715/702 |
| 2012/0072401 A1* | 3/2012 | Johri et al. .................... | 707/705 |
| 2013/0007499 A1* | 1/2013 | Moy .............................. | 713/400 |
| 2014/0229858 A1* | 8/2014 | Bleker et al. .................. | 715/753 |

OTHER PUBLICATIONS

Garate et al., Genio: An Ambient Intelligence Application in Home Automation and Entertainment Environment, Oct. 2005, Joint sOc-EUSAI conference.*

* cited by examiner

SYSTEM, METHOD AND APPARATUS FOR CONTROLLING PRESENTATION OF CONTENT

FIELD OF THE INVENTION

This invention relates to the field of content playback and more particularly to using gestures to move content from a first device to a second device.

BACKGROUND OF THE INVENTION

Devices such as televisions, media players, cellular phones, etc are all capable of reproducing various contents such as movies, video clips, music, etc. Many times, multiple devices in the same general area are capable of reproducing the same content, often with better or worst quality. For example, a portable music player is used in the same room as a stereo system or a cellular phone showing a video in the same room as a high-definition television. Many situations occur in which a user is enjoying a particular content on one device and desires to continue watching that content on a different device. For example, a user is listening to a playlist of songs while out and wants to continue with the current song and the rest of the songs on their home stereo when they return home. In another example, the user is watching a movie on a portable movie player or cellular phone and relocates to their living room where there is a large-screen, high-definition television. The user may desire to continue watching the movie on their television.

In the past, the user was able to listen to the music on their stereo or watch the same movie on their television, but the particular content and/or playlist needed to be also available on the destination device. Notwithstanding, to do so, the user needed to start the content (e.g. play the movie or listen to music in the playlist) then maneuver to the location in the content at which they left off using the other device. For example, if watching a movie, the user would have to fast forward to find the location at which the user left off on the first device. This takes time and effort to find the correct location in the content to continue play.

What is needed is a device cooperation system that transfers content from a first device to a second device.

SUMMARY

The present invention comprises a system that enables cooperating devices to transfer presentation of content from one device to the other by sending either the content or an identification of content from a source device to a destination device. In some embodiments, the actual content is transferred while in other embodiments, an identification of the content and a position within the content is transferred from the source device to the destination device.

In one embodiment, a system for transferring presentation of content from a source device to a destination device is disclosed. The source device has a display and a mechanism for detecting a gesture. The destination device also has a display and is communicatively coupled to the source device. Content is currently being presented on the display of the source device. Upon receiving the gesture, it is determined if the gesture indicates a request to transfer presentation of the content from the source device to the destination device and if so, the presentation of the content is transferred from the source device to the destination device.

In another embodiment, a method of transferring the presentation of content from a source device to a destination device is disclosed. A source device has a display and a means for detecting a gesture and a destination device has a second display. The source device is communicatively coupled to the destination device. Some form of content is currently presented at the source device and a gesture is received by a device for detecting gestures. If the gesture indicates moving a presentation of the content from the source device to the destination device, a current index into the content is determined and the destination device is commanded to initiate presentation of the content at the current index. If the gesture indicates moving presentation of the content from the destination device to the source device, the destination device is commanded to initiate a transfer of the presentation of the content from the destination device to the source device, the source device receives the transfer of the presentation of the content from the destination device and the source device presents the content.

In another embodiment, a system for transferring presentation of content from a source device to a destination device is disclosed. The source device and the destination device have displays. A wireless interface communicatively couples the destination device and the source device. Some form of content is currently being presented on the source device. The source device has a way to detect a gesture. If the gesture indicates a request to transfer presentation of the content from the source device to the destination device, presentation of the content is transferred from the source device to the destination device.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures. The examples described in this document show portable display devices such as media players (e.g. video player, music player, etc) and television devices. Any device is anticipated that has any type of display (e.g. LCD, LED, Plasma, CRT, OLED, e-paper, etc) and/or audio output device (e.g. speakers, headphones, etc). Devices include, but are not limited to, televisions, portable televisions, cellular phones, media players, video players, music players, monitors, computer systems, notebook computer systems, electronic books, tablet computers, etc. Although the examples show examples of video content, any type of content is anticipated such as television programs, movies, songs, albums, CDs, play lists, etc.

Figure 1:
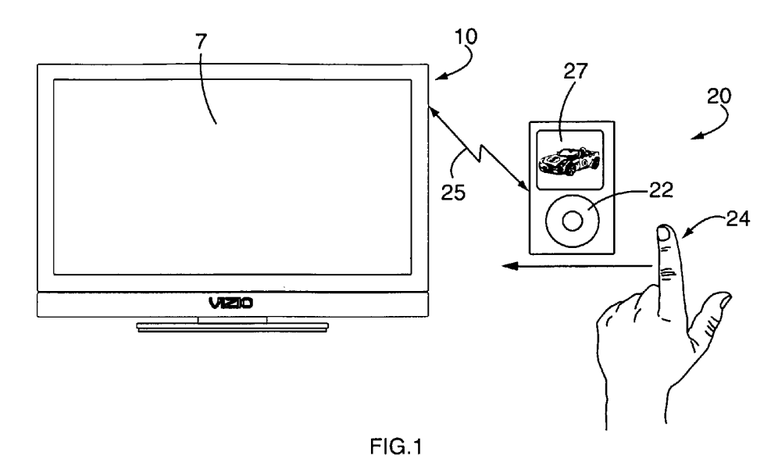
FIG. 1 illustrates a plan view of two exemplary devices capable of reproducing content.

Referring to FIG. 1, a plan view of two exemplary devices capable of reproducing content is shown. Although many pairs of devices are anticipated, in this example, the source device is a portable media player 20 (e.g. a music/video player or a cellular phone) and the destination device is a television 10. In this example, the user is watching a car race on a display 27 of their portable media player 20. Upon returning home, the user wants to continue watching the race on the display 7 of their television 10. To do such, the user makes a gesture 24 that is detected by the source device 20 by a detection device 22. There are many detection devices 22 known in the industry, for example, capacitive sensing pads, motion sensors, etc. Upon recognition of the particular gesture 24, the source device 20 establishes communication with the destination device 10 over a wireless interface 25. Examples of gestures 24 include making a motion with a hand or finger that is detected by the source device 20 and moving or shaking the source device 20 in the local of the destination device 10.

After communication is established, in one embodiment, the source device 20 transfers the presentation of the content by sending information regarding the content to the destination device 10 over the wireless path 25. For example, if the user is watching a broadcast movie on the source device 20, sufficient information is transferred from the source device 20 to the destination device 10 such that the destination device 10 knows how to tune into the particular broadcast, cable or satellite channel. In this embodiment, unless the source device 20 includes a personal video recorder, the destination device 10 tunes to the program (e.g. show, movie, program, music) and the program is at the same point in the program as being viewed on the source device 20.

In another embodiment, in which the same content is available to the destination device 10 as the source device 20, the source device 20 sends the identity of the content and an index into the content to the destination device 10. The destination device 10 finds and opens the content then seeks to the index position within the content to begin presentation of the content at the same position as was being viewed or listened to on the source device 20. For example, the identity is a file name or content title and the index is time in the example of a movie or an integer indicating an index into a play list, etc.

In another embodiment, in which the content is accessed by the source device 20 over a network and the same access is available to the destination device 10, the source device 20 sends the address of the content to the destination device 10 (e.g. a URL or network address such as X:\movies\agaig.mov). In some embodiments, the source device 20 also sends an index to the destination device 10. Upon reception, the destination device 10 accesses the content using the address transferred from the source device 10 and begins presentation of the content at the location indicated by the index.

In yet another embodiment, the remaining portion of the content is transferred from the source device 20 to the destination device 10. In such, it is expected that the bandwidth of the wireless connection 25 is sufficient to transfer the content and/or the content is buffered at the destination device 10 until sufficient content is available so as to present the content in a continuous fashion.

Figure 2:
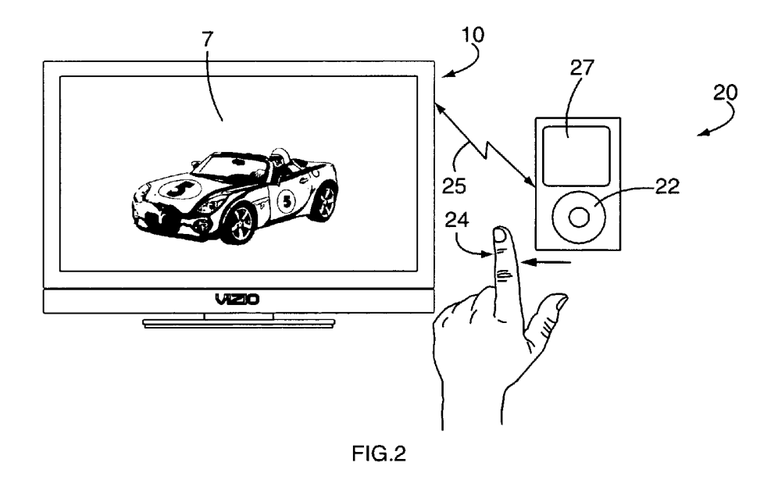
FIG. 2 illustrates a second plan view of two exemplary devices capable of reproducing content.
Figure 3:
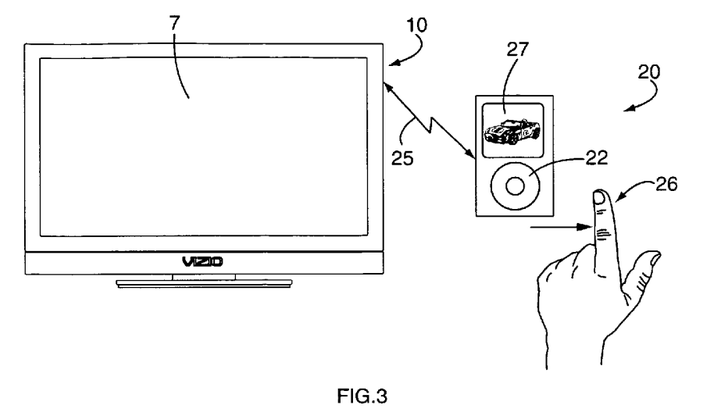
FIG. 3 illustrates a third plan view of two exemplary devices capable of reproducing content.

Referring to FIGS. 2 and 3, a second and third plan view of two exemplary devices capable of reproducing content is shown. In FIG. 2, the gesture 24 is complete and the presentation of the content was transferred from the source device 20 to the destination device 10 as described in FIG. 1 and the content is now shown on the display 7 of the destination device 10. The destination device has either accessed a local copy of the content, has accessed the content from the same or similar network content or the content has been transferred from the source device 20 to the destination device 10 as previously described. In some embodiments, the presentation of the content continues on the source device 20, while in other embodiments (copied), while in other embodiments, the content is no longer shown on the source device 20 (moved).

In FIG. 3, a different gesture 26 was made and the content was moved back from the destination device 10 to the source device 20 by accessing a local copy of the content, accessing the content from the same or similar network content or transferring/sending the content from the source device 20 to the destination device 10 similar to that previously described for the other direction.

It is anticipated that in this direction, the destination device 10 need only send the content identification and index, being that it is known that the content is available to the source device 20 because the source device 20 originally was viewing/listening to the content. The index indicates where in the location in the content to which the viewer has already viewed on the destination device 10. In this way, the viewer, through use of two different gestures 24/26, transfers presentation of the content back and forth between the source device 20 and the destination device 10.

Figure 4:
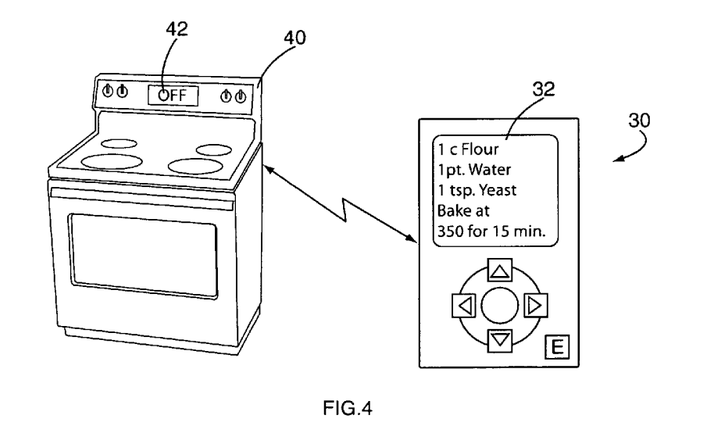
FIG. 4 illustrates a plan view of a second pair of devices capable of transferring content.
Figure 5:
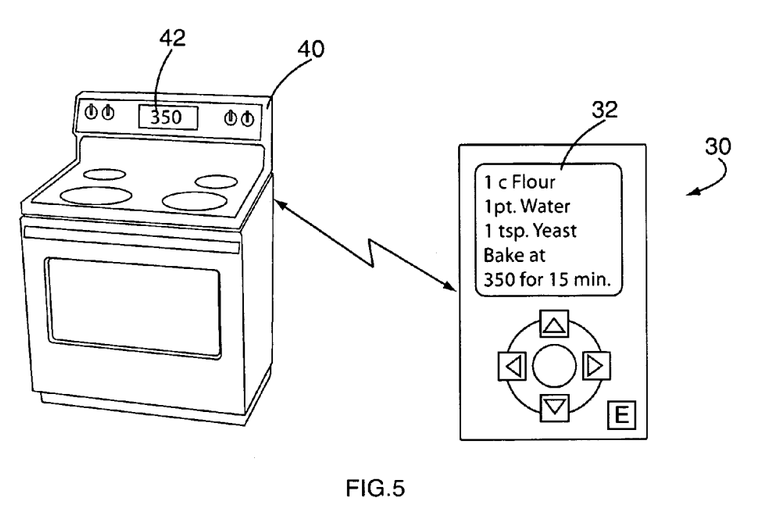
FIG. 5 illustrates a second plan view of a second pair of devices capable of transferring content.

Referring to FIG. 4, a plan view of a second pair of devices capable of transferring content is shown. In this example, the user is viewing a recipe 32 on a portable device such as a cellular phone 30. The receiving device, in this example, is a connected appliance or stove/oven 40 with an indicator 42 showing that the oven 40 is off. In FIG. 5, the user has made a gesture 24/26 and the device 30 has transferred the recipe 32 or part of the recipe 32 to the stove/oven 40 and the oven is set to the temperature of the recipe 32 as shown on the display 42. Additionally, it is anticipated that a timer of the oven/stove 40 is also set to the time required by the recipe 32. In some embodiments, the stove/oven 40 timer is set to the time required by the recipe. In these embodiments, the timer starts, for example, when the oven reaches the required temperature (e.g. 350 degrees) or after the user/cook puts the dish into the oven or upon user/cook command.

Although using a gesture, it is anticipated that in some embodiments, a keyboard command such as "enter" invokes the transfer of the recipe 32 or part of the recipe to the stove/oven 40.

Figure 6:
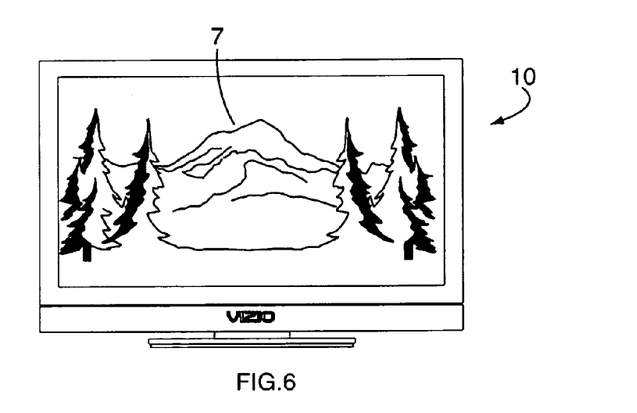
FIG. 6 illustrates a plan view of an exemplary content reproducing device.
Figure 7:
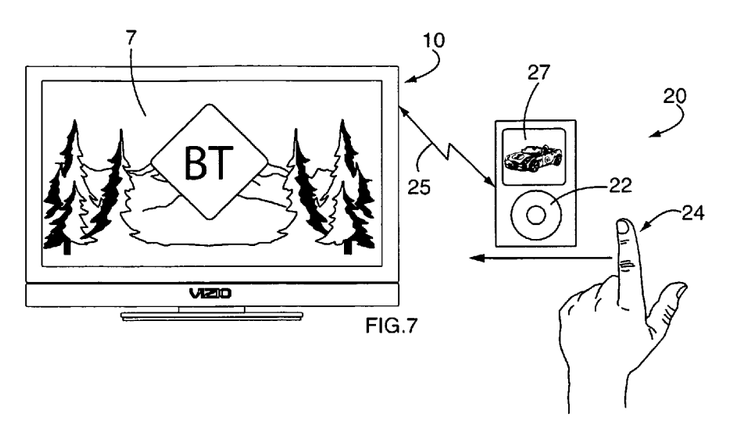
FIG. 7 illustrates a plan view of an exemplary content reproducing device with a second device within range.
Figure 8:
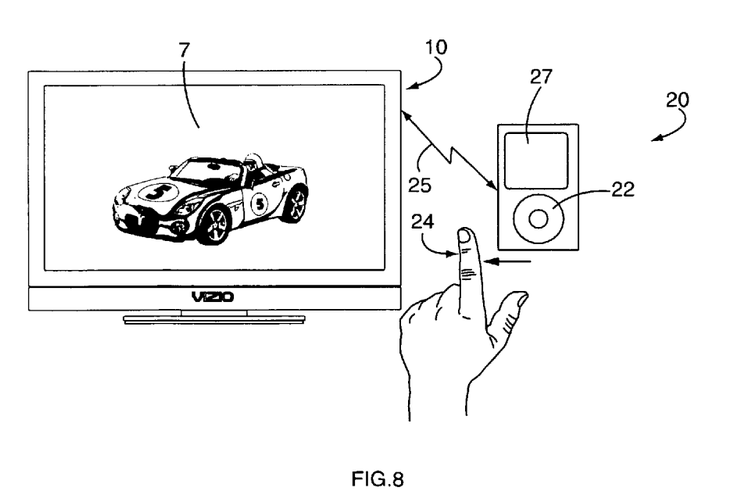
FIG. 8 illustrates a second plan view of an exemplary content reproducing device with a second device within range.

Referring to FIGS. 6-8, plan views of exemplary content reproducing devices are shown. In FIG. 6, the destination device 10 is showing a program on its display 7. In FIG. 7, the source device 20 has been detected by the destination device 10 and an indication 11 is made on the display 7. Although any communications mechanism is anticipated between the source device 20 and the destination device 10, including wired interfaces, a preferred interface is a wireless communications interface such as Bluetooth, IRDA and Wi-Fi, although any communication mechanism is anticipated. In the example of Bluetooth, once the source device 20 is within wireless range of the destination device 10, an indication 11 is made to indicate to the user that a gesture 24/26 or other command is appropriate as shown in FIG. 7. In the example of Wi-Fi, it is anticipated that the destination device 10 is in the Wi-Fi network and connected to, for example, a wireless router. Once the source device 20 is in range of the Wi-Fi network and connected, the destination device 10 is notified and the indication 11 is presented as shown in FIG. 7.

Once connected, either by command from the destination device 20 (e.g. a remote control command, etc) or by gesture 24, presentation of the content 27 is transferred from the source device 20 to the destination device 10 as previously described.

Figure 9:
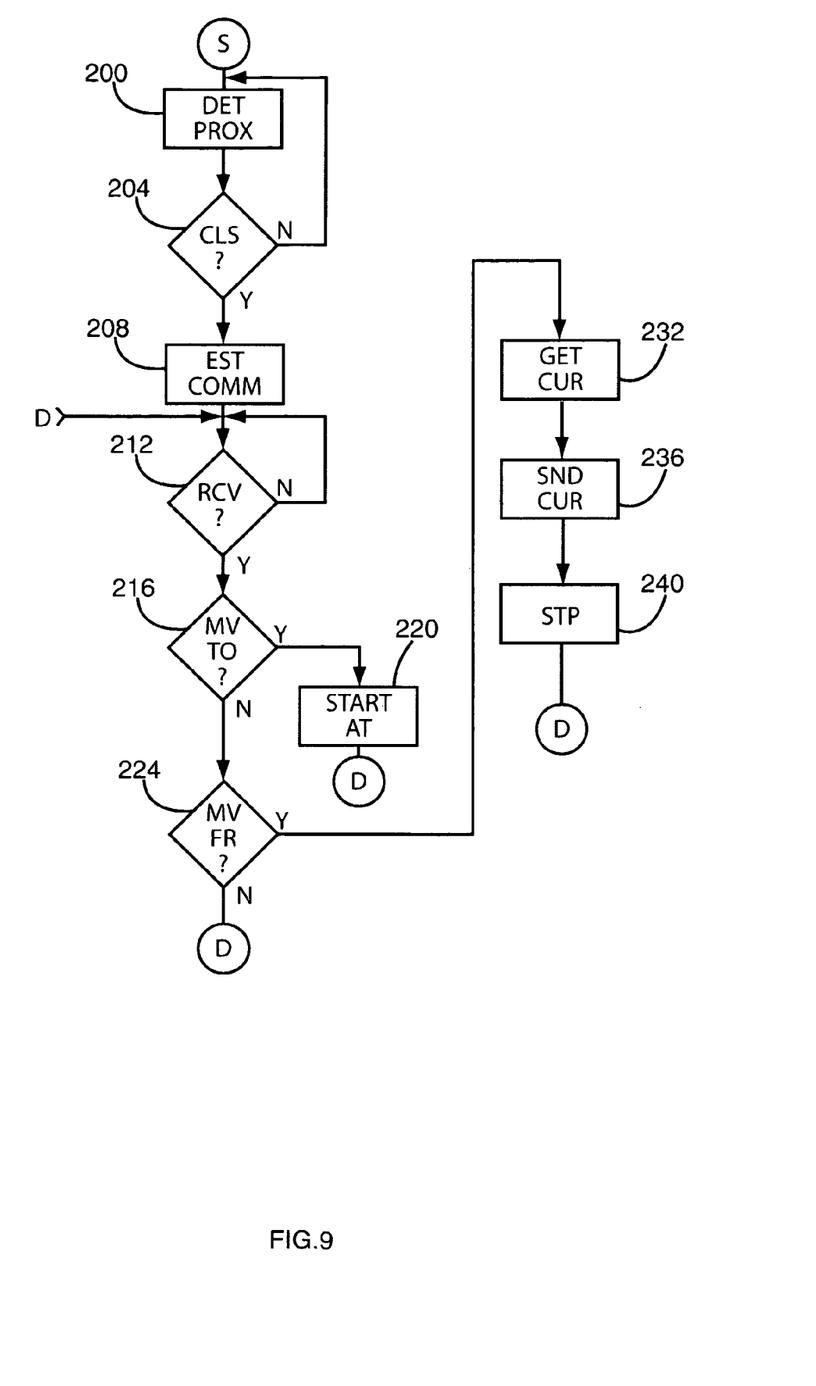
FIG. 9 illustrates a first flow chart for transferring content from a source device to a destination device.

Referring to FIG. 9, a first flow chart running in the destination device 10 for transferring content from a source device 20 to a destination device 10 is shown. The first step is to determine 200 when the source device 20 is within communication range of the destination device 10. Once it is determined 204 that communications is possible between the devices 10/20, communications is established 208 and the destination device 10 waits 212 to receive a command from the source device 20. Once a gesture 24/26 is received at the source device 20 (see FIG. 10), the type of gesture 24/26 is determined. Although many types of gestures 24/26 are anticipated, the examples of moving presentation of the content to the destination device 10 or moving from the destination device 10 are described. If the destination device 10 receives a move command (e.g. packet, message, etc) 216, the destination device 10 starts 220 presentation of the content at the index into the content as transferred in the received packet(s) or displays the content as received in packets from the source device 20.

If the destination device 10 receives a move from command 224 (e.g. packet, etc) 216, the destination device 20 determines the current index 232 into the content and sends the identification of the content and the index 236 to the source device 20 and, in some embodiments, stops 240 displaying the content on the display 7.

Figure 10:
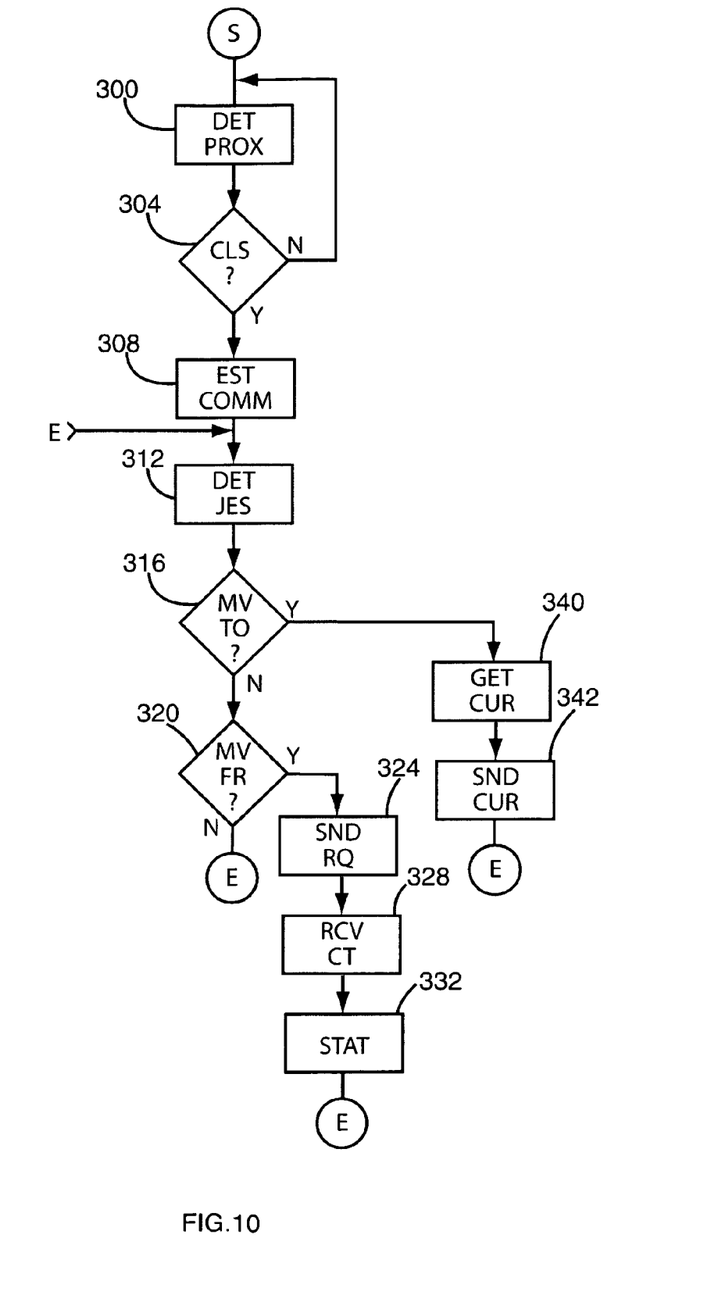
FIG. 10 illustrates a second flow chart for transferring content from a source device to a destination device.

Referring to FIG. 10, a second flow chart for transferring content from a source device to a destination device is shown. This flow is executed in the source device 20. The first step is to determine 300 when the source device 20 is within communication range of the destination device 10. Once it is determined 304 that communications is possible between the devices 10/20, communications is established 308 and the source device 20 waits 312 to receive a gesture 24/26 from the user. Once a gesture 24/26 is received 312, the type of gesture 24/26 is determined. Although many types of gestures 24/26 are anticipated, the examples of moving presentation of content to the destination device 10 or moving from the destination device 10 are described. If the gesture 24/26 is a move to 316, the current index into the content is determined 340 and a command is sent 342 to the destination device 20 to start presentation of the content at the current index or the remainder of the content is sent 342 in, for example, packets, to the destination device 10.

If the gesture 24/26 is a move from 320, a request is made 324 to the destination device 10 to retrieve the current content and/or index. Once a response is received 328, presentation of the content is started 332 on the source device 20 at the same spot as was being watched on the destination device 10.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for transferring presentation of content from a source device to a destination device, the system comprising:
    a source device having a display and having a detection device that detects a gesture that is entered by a user of the source device at the source device, where the gesture is detected by detecting the user's hand moving in a direction;
    said source device wirelessly detecting a destination device having a second display, and where the destination device is separate from and communicatively coupled to the source device;
    said source device operating to display content on the display of the source device;
    said source device including a processing element, determining if the gesture from the detection device is a first gesture entered at the source device where the moving is in a first direction that indicates a transfer-to request to transfer presentation of the content from the source device to the destination device and responsive to detecting said transfer-to request, to operate to communicate the presentation of the content from the source device to the destination device by getting a current index to a location of playing of the content, and sending said current index to the destination device along with the content such that the destination device takes over the presentation of the content at a location of the current index,
    wherein said processing element also determines if the gesture from the detection device is a second gesture entered at said source device where the moving is in a second direction and that indicates a transfer-from request to transfer presentation of the content from the destination device to the source device and responsive to detecting the transfer-from request operating to receive the content from the destination device along with an index indicating the location of playing of the content on the destination device, and to start playing at a location of the index, and
    wherein the presentation of the content is transferred by sending only a remainder of the content from the source device to the destination device, which comprises a portion of the content that has not already been shown on the display of the source device.

2. The system of claim 1, wherein the content is video.

3. A method of transferring the presentation of content from a source device to a destination device, the method comprising:
    displaying content on a source device having a display and a processor and having a detection device that detects a gesture that is entered by a user of the source device at the source device;
    detecting a gesture entered on the source device via said processor on said source device, where the gesture is detected by detecting the user's hand moving in a direction;
    said source device operating for determining if the gesture is a first gesture that indicates transferring a presentation of the content from the source device to the destination device by detecting the user's hand moving in a first direction, and responsive to determining the first gesture determining a current index into the content and commanding the destination device to initiate presentation of the content at the current index, and if the gesture is the first gesture that indicates moving presentation of the content from the source device to the destination device, communicating the presentation of the content from the source device to the destination device such that the destination device takes over the presentation of the content, and said source device operating for determining if the gesture is a second gesture that indicates moving the presentation of the content from the destination device to the source device by detecting the user's hand moving in a second direction, and responsive to determining the second gesture, then moving the same content back from the destination device back to the source device, and if the gesture is the second gesture, communicating the presentation of the content from the destination device to the source device, wherein the commanding of the destination device to initiate the presentation of the content at the current index includes sending an identification of the content and an index into the content from the source device to the destination device, and wherein the commanding of the destination device to initiate the presentation of the content at the current index includes sending a only remainder of the content from the source device to the destination device which comprises a portion of the content that has not already been shown on the display of the source device.

4. The method of claim 3, wherein the content is video.

\* \* \* \* \*